Oct. 24, 1967 B. C. GARRETT 3,349,370
WRITE AMPLIFIER CIRCUIT
Filed March 10, 1964
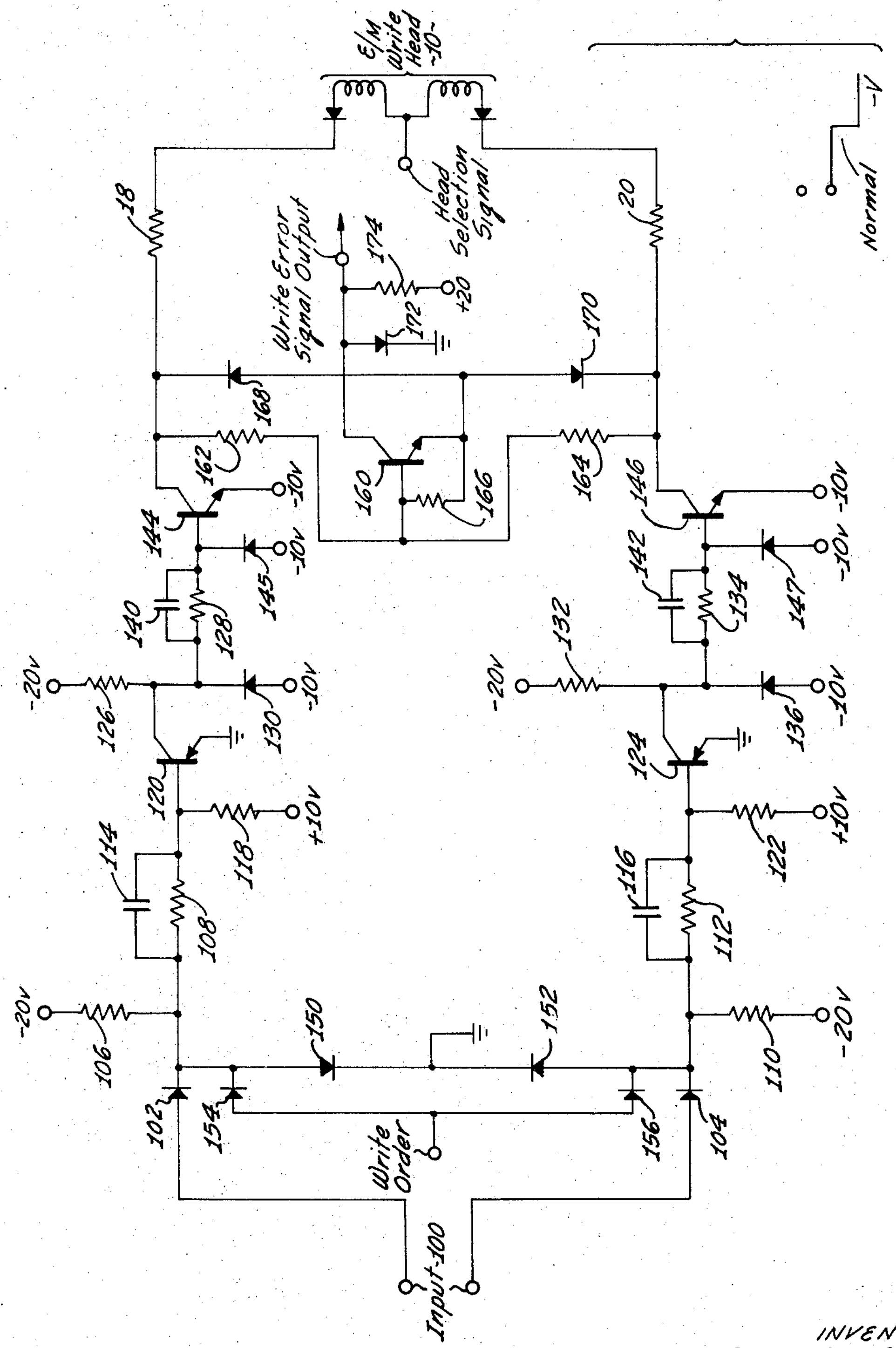
INVENTOR:
B. Charles Garrett
By [signature]
Attorney United States Patent Office 3,349,370

Patented Oct. 24, 1967

3,349,370

WRITE AMPLIFIER CIRCUIT

B. Charles Garrett, Sepulveda, Calif., assignor to General Precision Systems, Inc., a corporation of Delaware Filed Mar. 10, 1964, Ser. No. 350,723
2 Claims. (Cl. 340—146.1)

ABSTRACT OF THE DISCLOSURE

The circuit described herein is intended to be used in the write circuits of a digital computer in conjunction with a movable magnetic memory, and where Ferranti type of recording is used. The write circuit includes essentially push-pull connected transistors which supply the digital information to the memory. So long as operation is normal, one of the two push-pull transistors will always be conductive when the other is non-conductive, and vice versa. The present invention provides a circuit which is connected to the push-pull transistors to detect any occasion in which the two push-pull transistors depart from the normal, and are either both conductive or both non-conductive.

The present invention relates to magnetic storage systems for digital data, and it relates more particularly to an improved system for insuring reliability of digital data stored in a movable magnetic storage medium.

Electronic digital computers normally employ some form of storage system for the digital data used therein. Such a storage system is commonly referred to as the memory of the computer. The memory is usually formed of a rotatable magnetic drum or disc, and of read/write electromagnetic transducer heads magnetically coupled thereto, together with associated circuitry for the heads.

Magnetic materials which produce rectangular hysteresis loops have found wide acceptance in computer memories. Digital data stored in such memories is permanently held in a magnetic field and requires no additional power to hold it in a stored condition.

The magnetic materials which produce the aforementioned rectangular hysteresis loops possess two readily distinguishable remnant magnetic states. The information to be stored is stored in accordance with such remnant magnetic states. That is, in some systems, binary "1" is stored, for example, as a positive magnetic state, and binary "0" is stored as a negative magnetic state. In other systems, binary "1" is stored, for example, as a positive magnetic state followed by a negative magnetic state, and binary "0" is stored, for example, as a negative magnetic state followed by a positive magnetic state. The latter type of storage is referred to as Ferranti recording. The present invention is particularly concerned with the Ferranti type of recording.

When digital data is written into a magnetic memory, the magnetic state of the magnetic material is controlled by the creation of a magnetic field. This magnetic field is created by the aforementioned electromagnetic write heads. The sense of the magnetic field developed by the write heads produces the desired final states of the magnetic material in the memory.

The data stored in the memory may be retrieved by sensing the magnetic state of the magnetic material. This is achieved in a manner well understood to the art, and by means of the aforementioned read heads.

In considering the problem of reliability of data stored in a rotating magnetic memory, the main area of concern, insofar as the storage medium and associated circuitry are concerned, is that a failure of the write circuitry could go unnoticed in the usual present day digital data memory systems. This means that data can be written incorrectly into the memory of most present day memory systems and subsequently lost.

A similar failure in the read circuitry is not as serious. This is because the latter failure can be detected by means of simple parity error circuits. Therefore, when a failure occurs in the read circuitry, the source of the error can be readily detected, so that the error can be rectified and the data can be retrieved.

In the system of the present invention, and in the embodiments to be described, detection circuitry is included in the write chain of the memory system. This detection circuitry detects any departure of the write signals from their normal characteristics, and it responds to such a departure to develop a write error signal. This write error signal can be used in any desired manner to activate an alarm system and/or to initiate certain corrective control effects.

It is an object of the present invention, therefore, to provide an improved error detection circuit for inclusion in the write chain of a digital memory system, which detection circuit responds to the electrical write signals in the write chain to produce a write error signal whenever the characteristics of such write signals depart from normal.

Another object of the invention is to provide such an improved error detection circuit which is simple in its concept and which can be incorporated into the aforesaid write chain without complicating the circuitry of the chain to any appreciable extent.

Other objects and advantages of the present invention will become apparent from a consideration of the following description, when the description is taken in conjunction with the accompanying drawing, in which the single figure is a circuit diagram of a presently preferred embodiment of the invention.

The illustrated circuit includes a pair of input terminals 100, these being connected through respective diodes 102 and 104 to the respective junctions of resistors 106, 108 and 110, 112. The resistors 106 and 110 may each have a resistance of 4.3 kilo-ohms, and the resistors 108 and 112 may each have a resistance of 2 kilo-ohms. A capacitor 114 shunts the resistors 108, and a similar capacitor 116 is shunted across the resistor 112. Each of these capacitors may have a capacitance of .47 picofarad.

The resistor 108 is connected to a resistor 118 and to the base of a PNP transistor 120. The resistor 112, likewise, is connected to a resistor 122 and to the base of a PNP transistor 124. The resistors 118 and 122 may each have a resistance of 11 kilo-ohms, and these resistors are connected to the positive terminal of a 10 volt direct voltage source.

The transistors 120 and 124 each include a grounded emitter. The collector of the transistor 120 is connected to the junction of a resistor 126, a resistor 128 and the cathode of a diode 130. The collector of the transistor 124 is, likewise, connected to the junction of a resistor 132, a resistor 134 and the cathode of a diode 136.

The diodes 130 and 136 are connected to the negative terminal of the 10 volt direct voltage source. The resistors 126 and 132 may each have a resistance of 820 ohms, whereas the resistors 128 and 134 may each have a resistance of 1.1 kilo-ohms. The resistor 128 is shunted by a 270 picofarad capacitor 140, and the resistor 134 is shunted by a like capacitor 142.

The resistor 128 is connected to the base of an NPN transistor 144, and the resistor 134 is connected to the base of an NPN transistor 146. The emitters of the transistors 144 and 146 are connected to the negative terminal of the 10 volt direct voltage source. The collector of the transistor 144 is connected to one side of the winding of an electromagnetic write head 10 through a current limit resistor 18, whereas the collector of the transistor 146 is connected to the other extremity of the winding of the write head 10 through a current limit resistor 20. A positive head selection signal is introduced to the center tap of the winding of the head 10.

A diode 145 has its cathode connected to the base of the transistor 144, and the anode of the diode 145 is connected to the negative terminal of the 10 volt source. A similarly connected diode 147 is connected to the base of the transistor 146.

The circuitry of the figure includes a pair of diodes 150 and 152 which are connected between the junction of the resistors 106, 108 and 110, 112 and ground. The circuit is activated by a write order, which is introduced through a pair of diodes 154, 156 respectively to the anodes of the diodes 150 and 152. When the write order swings positive, the diodes 154, 150 and 156, 152 are rendered conductive, so as to de-activate the write circuitry of the figure. The purpose of diodes 150 and 152 is to clamp the second half cycle of ringing that results from an input going negative.

The error detection circuit of the present invention includes an NPN transistor 160. The collector of the transistor 144 is connected to the base of the transistor 160 through a 12 kilo-ohm resistor 162. Likewise, the collector of the transistor 146 is connected to the base of the transistor 160 through a 12 kilo-ohm resistor 164.

The base of the transistor 160 is connected to its emitter through a 820 ohm resistor 166. The emitter is further connected to the anodes of a pair of diodes 168, 170. The cathode of the diodes 168 is connected to the junction of the resistors 18 and 62, whereas the cathode of the diode 170 is connected to the junction of the resistors 20 and 164.

The collector of the transistor 160 is connected to the anode of a diode 172 and to a resistor 174. The cathode of the diode 172 is grounded, and the resistor 174 is connected to the positive terminal of the 20 volt direct voltage source. The resistor 174 may have a resistance, for example, 3.3 kilo-ohms.

The write error signal is developed at the collector of the transistor 160. Under normal circumstances, this error signal is −10 volts, for example. However, when either of the Ferranti complemented write signals applied to the input terminals 100 departs from its normal characteristics, the write error signal rises to zero. This write error signal can be used, as in the previous embodiment, to actuate an alarm system, or to initiate any desired control effect.

When the usual Ferranti type of recording is used, the write signal voltage applied to the head 10 comprises, for binary "1," for example, a positive half cycle followed by a negative half cycle applied to the upper side, and an out-of-phase like voltage applied to the lower side. For binary "0," on the other hand, a negative half cycle followed by a positive half cycle is applied to the upper side and the inverse is applied to the lower side.

Under the above mentioned conditions for normal write operations, one of the transistors 144, 146 is conductive while the other is non-conductive, and vice versa. Therefore, any condition in which both the transistors 144, 146 are either conductive or non-conductive represents an abnormal condition. The illustrated circuit responds to such an abnormal condition to cause the write error signal output developed by the transistor 160 to swing from a negative voltage to approximately zero volts.

Under a normal condition during which the transistor 144 is non-conductive and the transistor 146 is conductive; the emitter of the transistor 160 is established at a negative potential (through diode 170) by the conductive transistor 146, and the base of the transistor 160 is established at a less negative potential due to the fact that the resistor 144 is non-conductive (assuming a positive head selection voltage). Therefore, the transistor 160 is conductive, and the error signal output is held at its normal negative value.

Under the normal condition during which the transistor 144 is conductive and the transistor 146 is non-conductive; the emitter of the transistor 160 is established at a negative potential (through diode 168) by the conductive transistor 144, and the base of the transistor 160 is established at a less negative potential due to the fact that the transistor 146 is non-conductive (again assuming a positive head selection signal). Therefore, again the transistor 160 is conductive to hold the write error output signal at its normal negative value.

Now, under abnormal conditions, both the transistors 144 and 146 are either simultaneously conductive or simultaneously non-conductive. In either event, the transistor 160 is rendered non-conductive. This causes the write error output signal to swing to approximately zero volts.

As mentioned above, suitable equipment and circuitry (not shown) may be provided which responds to the swing of the error signal to zero. This latter circuitry may provide any desired indication, alarm, or control effect indicative of an error in the write operation.

The invention provides, therefore, simple and straightforward circuitry for detecting errors and malfunctions in the write chain of the magnetic memory incorporated in a digital computer. This circuitry is extremely simple in its concept, yet functions extremely well as an eavesdrop detection circuit, so that writing malfunctions will not go unnoticed.

While a particular embodiment of the invention has been shown and described, modifications may be made. It is intended in the claims to cover all modifications which fall within the scope of the invention.

What is claimed is:

1. In an electric write circuit for recording binary signals on a magnetic medium in the form of a first magnetic state followed by a second magnetic state for binary "1," and in the second magnetic state followed by the first magnetic state for binary "0," said write circuit including: an electric winding having an intermediate tap thereon for receiving an activating signal, a first transistor coupled to one end of said winding, a second transistor coupled to the other end of said winding, and circuit means for applying complemented signals to said first and second transistors to record corresponding binary signals on the magnetic medium, said complemented signals alternately causing one of said transistors to be conductive and the other to be non-conductive during normal write operations; an error detector circuit including a further transistor; a control circuit coupling said further transistor to said first and second transistors to cause said further transistor to change its state of conductivity whenever said first and second transistors exhibit the same state of conductivity; and further circuitry coupled to said further transistor for deriving an error signal therefrom indicating such change in the state of conductivity of said further transistor.

2. The electric write circuitry defined in claim 1 in which said further transistor develops said error signal when said first and second transistors are simultaneously in a conductive or non-conductive state.

(References on following page)

References Cited

UNITED STATES PATENTS

| | | | |
|---|---|---|---|
| 2,929,049 | 3/1960 | Lubkin | 340—174 |
| 2,972,128 | 2/1961 | Eckert et al. | 340—172.5 |
| 2,981,937 | 4/1961 | Hoberg | 340—213 |
| 3,078,448 | 2/1963 | O'Brien | 340—174.1 |
| 3,148,334 | 9/1964 | Danielson et al. | 328—92 |

OTHER REFERENCES

Boenninghausen, R. A., "Circuit for Detecting Errors," IBM Technical Disclosure Bulletin: vol. 3, No. 7, December 1960.

MALCOLM A. MORRISON, *Primary Examiner.*

K. F. MILDE, *Assistant Examiner.*